(12) United States Patent
Van Der Meer et al.

(10) Patent No.: US 7,481,151 B2
(45) Date of Patent: Jan. 27, 2009

(54) BEVERAGE MAKER SUITABLE FOR USE AT HIGH ALTITUDES

(75) Inventors: Sijtze Van Der Meer, Hoogeveen (NL); David Johannus Theodorus Huntink, Hoogeveen (NL)

(73) Assignee: Koninklijke Philips Electronics N.V., Enidhoven (NL)

( * ) Notice: Subject to any disclaimer, the term of this patent is extended or adjusted under 35 U.S.C. 154(b) by 396 days.

(21) Appl. No.: 10/564,384

(22) PCT Filed: Jul. 12, 2004

(86) PCT No.: PCT/IB2004/051198

§ 371 (c)(1), (2), (4) Date: Jan. 12, 2006

(87) PCT Pub. No.: WO2005/004684

PCT Pub. Date: Jan. 20, 2005

(65) Prior Publication Data
US 2006/0207432 A1      Sep. 21, 2006

(30) Foreign Application Priority Data
Jul. 15, 2003    (EP) .................................. 03102171

(51) Int. Cl.
A47J 31/00         (2006.01)
(52) U.S. Cl. ........................... 99/281; 99/289 R; 99/295
(58) Field of Classification Search ........... 99/279–323, 99/275–277, 495, 468, 486
See application file for complete search history.

(56) References Cited

U.S. PATENT DOCUMENTS

| | | | | |
|---|---|---|---|---|
| 4,055,114 A | * | 10/1977 | Kats et al. ..................... | 99/280 |
| 5,761,245 A | * | 6/1998 | Haukkavaara et al. ....... | 375/267 |
| 6,000,317 A | * | 12/1999 | Van Der Meer ............... | 99/282 |
| 6,082,245 A | * | 7/2000 | Nicolai ......................... | 99/282 |
| 6,888,529 B2 | * | 5/2005 | Bruning et al. ............. | 345/102 |
| 2001/0014430 A1 | | 8/2001 | Dubs | |
| 2001/0046192 A1 | | 11/2001 | Kaneko et al. | |

FOREIGN PATENT DOCUMENTS

| | | |
|---|---|---|
| EP | 1006513 A2 | 6/2000 |
| GB | 2350717 A | 12/2000 |
| WO | WO9838637 | 9/1998 |
| WO | WO9949458 | 9/1999 |
| WO | WO0288580 A1 | 11/2002 |

* cited by examiner

Primary Examiner—Timothy F. Simone

(57) ABSTRACT

A beverage maker has a valve structure (13; 43; 153) adapted block the return of water from a boiler (5) to its water reservoir (2) in response to a water pressure from the boiler exceeding a shut-off pressure value. The valve structure (7; 47; 107) further includes a discharge outlet (20; 120) connected for water outflow to the brewing unit (8) and is adapted to open a passage from that inlet (9; 109) to the discharge outlet (20; 120) in response to a water pressure at the inlet (9; 109) exceeding a discharge pressure value below the pumping pressure. The valve structure (7; 47; 107) is further adapted to block the return of water from the boiler (5) to the water reservoir (2) also in response to a water pressure from the boiler below a relief pressure value above atmospheric pressure and below the shut-off pressure value. The pressure in the boiler during heating towards boiling is thus kept above atmospheric pressure.

14 Claims, 3 Drawing Sheets

BEVERAGE MAKER SUITABLE FOR USE AT HIGH ALTITUDES

Figure 1:
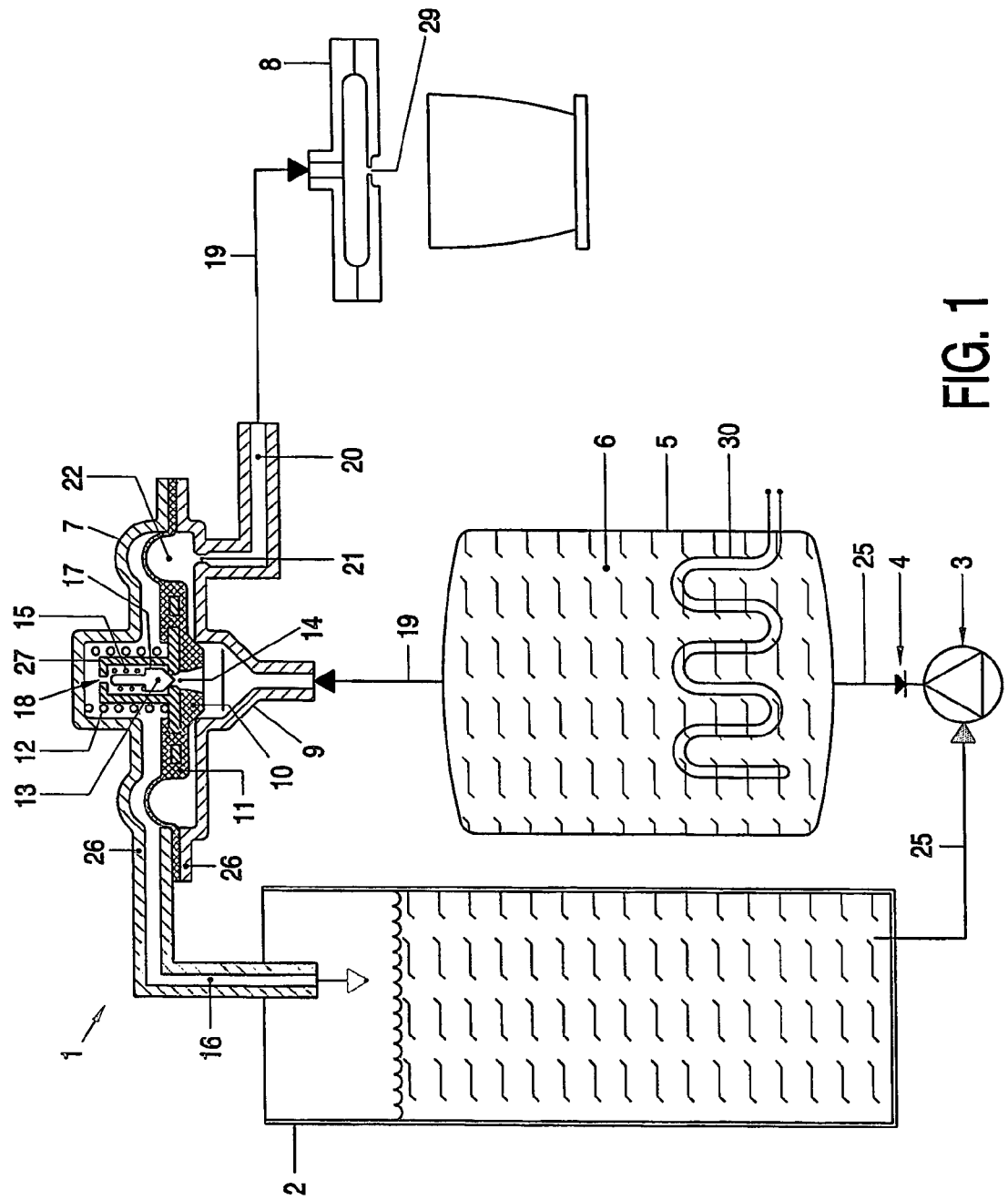

The present invention relates to a beverage maker comprising a boiler for heating water and a pump for displacing heated water from the boiler via a discharge channel through a beverage brewing unit. In such beverage makers, it is usual that some water escapes via the discharge channel during heating of water in the boiler owing to expansion of the water in the boiler as it is heated. In practice, this frequently leads to leakage complaints from consumers and soiling of the platform on which cups or other receptacles are placed to receive brewed beverage therein.

International Patent Application WO02/088580 describes a valve which, when positioned in a return channel from the boiler to a water reservoir from which water is supplied to the boiler, allows excess volumes of water to escape from the boiler back to the water reservoir, while the valve is in its normal, open condition, so that excess volumes of water caused by expansion of water in the boiler do not escape via the discharge channel. When the water is being pumped from the boiler to the coffee brewing unit at a substantial pressure in order to obtain the desired brewing conditions, the pressure drop across the valve exceeds a shut-off value, in response to which the valve closes. In this closed position, the valve prevents heated water from returning to the water reservoir, so that the heated water flows to the brewing unit only.

A disadvantage of beverage makers as discussed above is that, when the beverage maker is used at relatively high altitudes, water in the boiler reaches its boiling temperature at a temperature that is too low to allow brewing of high quality beverage, in particular taking into account heat losses that occur before and during brewing. Another problem of such beverage makers having a thermostatically controlled heater is that, when used at high altitude, the water starts to boil before the water temperature is reached at which the heater is switched off. As a result excessive steam formation occurs, and continuing to heat the water in the boiler after it has reached its boiling temperature wastes energy.

It is an object of the present invention to provide a beverage maker in which water is heated to a sufficiently high temperature for brewing beverage, even if the beverage maker is used at high altitude, while excess volumes of water caused by expansion of water in the boiler are nevertheless returned to the water reservoir.

According to the present invention, this object is achieved by providing a beverage maker according to claim 1. By preventing the passage of water to the return outlet and the discharge outlet if the pressure in the boiler is below a predetermined relief pressure higher than the atmospheric pressure, an overpressure in the boiler is ensured before the water is discharged under a higher pressure for brewing beverage. This in turn ensures that the water can be heated to a boiling temperature, which is sufficiently high for brewing high quality beverage, even if the beverage making is carried out at high altitude.

It is a further advantage in beverage makers with a thermostatically controlled heater that the temperature at which the heater is switched off or controlled to operate at a lower power is reliably reached.

Furthermore, the pressure in the boiler is allowed to be relatively high in such beverage makers without causing substantial steam formation when the brewing water is discharged from the pressurized boiler towards the lower pressure prevailing in or downstream of the beverage brewing unit, because the water temperature is limited by the thermostatic heater control. Thus the temperature to which the water is heated will be the same, independently of the altitude above sea level at which the beverage is brewed. It is observed that some steam formation upon release of the water from the excess may be advantageous for compensating for heat losses.

Particular embodiments of the invention are set forth in the dependent claims. Further aspects, effects and details of the invention are described with reference to examples shown in the drawings.

Figure 2:
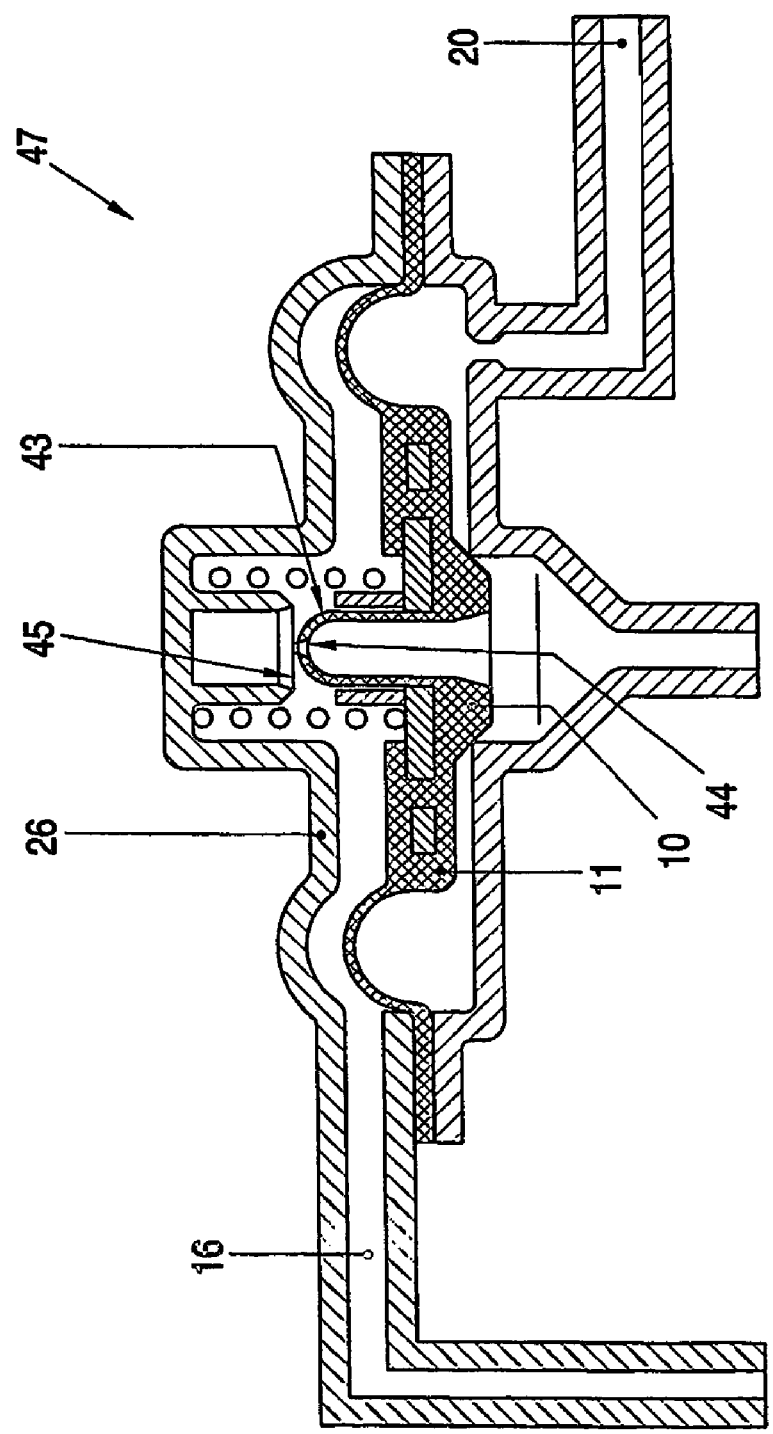
Figure 3:
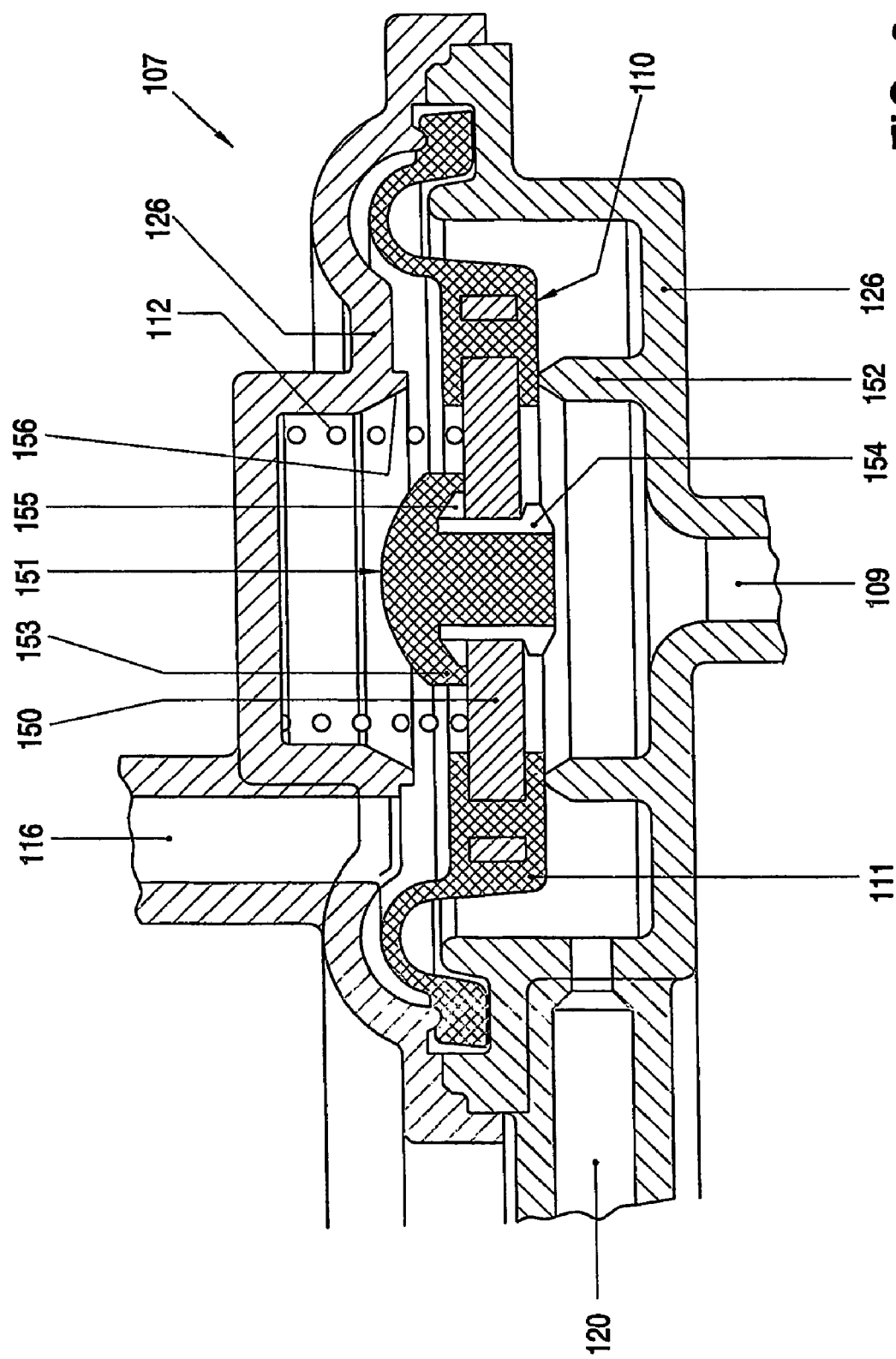

FIG. 1 schematically shows an example of a beverage maker according to the invention, comprising a first embodiment of a valve system, FIG. 2 schematically shows a second embodiment of a valve system for a beverage maker according to the invention, and FIG. 3 schematically shows a third embodiment of a valve system for a beverage maker according to the invention.

Reference is first made to FIG. 1. In this embodiment the beverage maker comprises a coffee maker, but it is noted that the invention also relates to other types of beverage makers such as, for example, for making tea or hot cocoa. The shown coffee maker 1 comprises a water reservoir 2, a closed water boiler 5 with a thermostatically controlled heater 30, and a coffee-brewing unit 8. The boiler 5 is completely filled with water 6 and is designed to resist a fluid overpressure with respect to the surrounding atmospheric air pressure.

The coffee maker 1 has a water supply line 25 between the reservoir 2 and the boiler 5. The water supply line 25 extends via a pump 3 for pumping water from the reservoir 2 to the boiler 5. Before coffee brewing can be started, boiler 5 heats the water to the desired water temperature. The channel 25 further extends via a check valve 4.

From the boiler 5, a water discharge channel 19 extends via a valve structure 7 to the coffee brewing unit 8. The valve structure 7 is an integrated valve structure in which a return flow control valve 13 is integrated with a discharge control valve 10 forming part of a membrane 11 of the discharge control valve 10. A water inlet 9 of the valve structure 7 connects to a section of the water discharge channel 19 connecting to the boiler 5 and is furthermore in open connection with an inlet portion 14 of the return flow control valve 13. The return flow control valve 13 has a return outlet 18 which is connected to a water return channel 16 leading to the water reservoir 2, which is in open communication with the atmosphere, so that the pressure in the water reservoir is in principle equal to the atmospheric pressure.

In operation, water 6 that is heated in the boiler 5 expands more than the boiler so that an excess volume of water is obtained. If the return flow control valve 13 is open, the excess volume of water from the boiler 5 is allowed to flow back to the reservoir 2 via the return flow control valve 13. However, during initial heating-up of water in the boiler 5, both the return flow control valve 13 and the discharge control valve 10 are initially closed. The closed position of the valves 10, 13 ensures that the pressure inside the boiler 5 rises to and is then maintained above atmospheric pressure. The return flow control valve 13 is conditioned to open only when the pressure drop across it exceeds a predetermined relief pressure value. Thus excess volumes of water are allowed to flow back to the reservoir 2, but only if the pressure in the boiler 5 has reached a predetermined relief pressure value.

The return flow control valve 13 is additionally adapted to close when the pressure drop across it exceeds a predetermined shut-off value higher than the relief pressure value, and the discharge control valve 10 is adapted to open in response to a pressure drop across it exceeding a predetermined discharge pressure value.

The discharge control valve 10 has a discharge outlet 20 connected to the brewing unit 8 via a further section of the water discharge channel 19. After water has been heated in the boiler 5 to a predetermined temperature and the coffee brewing unit 8 has been made ready for brewing coffee, the pump 3 is activated and pumps water from the reservoir 2 to the boiler 5. Thus, the water pumped into the boiler 5 displaces other water from the boiler 5 at a substantial pressure. The pressure exerted by this pumping action causes the return flow control valve 13 to close and the discharge control valve 10 to open, so that the pumping pressure pushes water to and through the coffee brewing unit 8.

The pump 3 may be automatically put into operation in response to a predetermined fluid temperature in the boiler 5. Preferably, the return flow control valve 13 closes before the discharge control valve 10 opens, so that a return of heated water to the water reservoir due to the pumping action is avoided.

The valve structure 7 comprises a rigid housing 26 and, inside the housing 26, a valve body 11 in the form of a membrane of a suitable flexible material such as rubber. The membrane 11 has a substantially disc-shaped plan form of which the peripheral edge is clamped between parts of the housing 26. FIG. 1 shows a radial intersection of the valve structure 7 through the centerline of the membrane 11. The housing 26 also has a substantially disc-shaped plan form. A number of components of the valve structure 7, among which the abovementioned water inlet 9, the second pressure control valve 10, and the first pressure control valve 13, are each centered with respect to the centerline of the housing 26 and membrane 11.

The return flow control valve 13 is housed in a rigid return flow control valve housing 27 which is integrated in the membrane 11 as a mounting for the rubber portion of the membrane 11. The condition of the return flow control valve 13 is controlled by the action of a first coil spring 15 inside the return flow control valve housing 27. The return flow control valve housing 27 further has an outlet bore 18. Opening and closing of the return flow control valve 13 are influenced by several design choices which relate inter alia to the first spring 15, the return flow control valve 13, the return flow control valve housing 27, the inlet portion 14, and the outlet bore 18. These choices are made such that the return flow control valve 13 is adapted to be in the open position only when the overpressure in the boiler 5 is higher than the relief pressure value but lower than the shut-off pressure value and to be in the closed position for other values of the overpressure in the boiler 5.

More specifically, when the overpressure in the boiler 5 is lower than the relief pressure value, the pressure acting upon the return flow control valve 13 is such that the spring force of the first spring 15 keeps the return flow control valve 13 in a position closing off the inlet portion 14. When the overpressure in the boiler 5 is higher than the relief pressure value but lower than the shut-off pressure value, the return flow control valve 13 in the return flow control valve housing 27 closes off neither the inlet portion 14 nor the outlet bore 18. And when the overpressure in the boiler 5 is higher than the shut-off pressure value, the valve 13 closes off the outlet bore 18.

Preferably, the relief pressure value is selected within a range between 0.1 bar and 0.5 bar and is most preferably about 0.3 bar. This ensures boiling temperatures of the water in the boiler, which are high enough even if the coffee is brewed at altitudes of up to about 3000 m, without subjecting the boiler to such pressures that a particularly strong design is required. An altitude range from sea level to about 3000 m above sea level covers almost all altitudes where beverage makers are customarily used. The temperature to which the water in the boiler is heated may be limited by the boiling temperature, but is preferably limited by a thermostatic heater control. This renders it possible to heat the water to the same temperature, independently of the height above sea level at which the water is heated. Furthermore, the thermostatic control of the water temperature allows a relatively wide tolerance range of the relief pressure value, because deviations in the pressure drop across the return flow control valve 13 do not cause the water to be heated to a temperature that deviates from the desired temperature for brewing coffee, as long as it is ensured that the boiling temperature is higher than the temperature at which the thermostatic control switches off or reduces the heating power.

The predetermined shut-off pressure value is preferably between 0.4 bar and 1.4 bar and preferably at about 1 bar. This ensures a quick shut-off in response to activation of the pump 3 and the associated pressure build-up, so that the return of substantial volumes of heated water to the water reservoir 2 is avoided.

A second coil spring 12 is clamped between the interior side of the upper part of the valve structure housing 26 and the exterior side of the return flow control valve housing 27 and controls the condition of the discharge control valve 10. Opening and closing of the discharge control valve 10 are influenced by several design choices which relate inter alia to the second spring 12, the membrane 11 with discharge control valve 10, and the water inlet 9. These choices are made such that the discharge control valve 10 is adapted to open in response to an overpressure in the boiler 5 above the discharge pressure value. That is, when the overpressure in the boiler 5 is less than the discharge pressure value, the spring force of the second spring 12 keeps the discharge control valve 10 in a position closing off the water inlet 9. In response to an overpressure in the boiler 5 exceeding the predetermined discharge pressure value, the valve 10 will open and remain open as long as that pressure condition prevails.

Preferably, the discharge pressure value is selected to be above 0.8 bar and more preferably at about 1.2 bar. This ensures a quick pressure build-up causing the return flow control valve to close quickly and reliably. The pumping pressure may be any desired pressure, for instance 1.5 to 2.5 bar for low-pressure beverage makers up to about 15 bar for classic espresso-type beverage makers.

The pumping phase can be subdivided into an early pumping stage and a later pumping stage. In the later pumping stage, the fluid flow from the boiler 5 to the brewing unit 8 has developed such that the discharge outlet 20, the tubing 19, and the brewing unit 8 are completely filled with hot water. The brewing unit 8 has a relatively narrow coffee outlet 29. The discharge outlet 20, tubing 19, and brewing unit 8 with coffee outlet 29 create, enough resistance for the fluid flow to keep the discharge control valve 10 in steady open position in this later pumping stage. That is, the pressure distribution under the membrane 11 constantly remains high enough then.

In the early pumping stage, however, especially immediately after opening of the discharge control valve 10, the discharge outlet 20, tubing 19, and brewing unit 8 may not yet be completely filled with hot water. They therefore do not create enough resistance in this early pumping stage for the fluid flow to keep the discharge control valve 10 in a steady open position. In order to avoid that this may lead to pulsation of the discharge control valve 10, the discharge outlet 20 has been provided with a restriction 21 downstream of and closely adjacent to the discharge control valve. The narrowness of the restriction 21 provides sufficient resistance to ensure that the pressure in the space 22 rises quickly at the beginning of the pumping stage, thereby avoiding pulsation of the valve 10. It is remarked that, with a view to the life span of the membrane 11, the upper part of the housing 26 is shaped in conformity with the shape of the top side of the membrane 11 for receiving and supporting the membrane 11 together with its integrated parts.

In closed condition, the valve body 11 preventing water passage from the inlet 9 to the discharge outlet has a first surface area communicating with the boiler 5. In opened condition allowing water passage from the inlet 9 to the discharge outlet, this valve body 11 has a second surface area communicating with the boiler 5, which second surface area is larger than the first surface area This further contributes to an abrupt and full opening of the discharge valve 11 without initial oscillations between a opened and a closed condition and it causes the discharge valve 11 to close in response to a lower pressure than the pressure in response to which it opens. Thus, when the pump 3 is stopped after sufficient amounts of water have been passed through the coffee brewing unit 8 and the pressure gradually drops as the final amounts of water flow through the brewing unit 8, the discharge valve 11 stays open until the pressure at the inlet 9 is well below the discharge pressure at which the discharge valve 11 opens. Accordingly, the discharge valve 11 closes reliably immediately, which further contributes to water dripping from the discharge channel.

When the pump 3 stops pumping, the residual pressure in the system releases through the brewing unit 8. Valve 10 closes as soon as the pressure in space 22 has dropped to a level where the spring 12 is able to close the valve 10 again. Shrinkage of the fluid in the boiler 5 may lead to an underpressure in the boiler 5, which is no problem if the boiler 5 is strong enough or if the check valve 4 allows water to flow into the boiler 5.

It is observed that, while the return flow control valve 13 and the discharge control valve 10 will be designed to open or close in response to predetermined values being exceeded, tolerances around these predetermined values will have to be accepted in practice. Such tolerances may have different causes, such as tolerances on the spring force characteristics of the springs 12 and 15, or, for example, changes caused by deposits on various components of the valve structure 7. If a first, a second, and a third tolerance range are applicable to the respective predetermined pressure values, it is preferable that said first, second and third tolerance ranges do not overlap each other. Overlapping of these tolerance ranges may cause malfunctioning of the valve structure 7 in individual cases where the actual predetermined pressure values are related unfavorably to each other.

FIG. 2 shows a second embodiment of a valve structure 47 for a beverage maker according to the invention. The valve structure 47 of FIG. 2 is identical to the valve structure 7 of FIG. 1 in many respects. Therefore, some of the corresponding parts of both valve structures have been given the same reference numerals.

An essential difference between the two valve structures 4 and 47 is that the valve structure 47 according to FIG. 2 has a different return flow control valve 43. This return flow control valve 43 shown in FIG. 2 is a fully integrated part of the membrane 11 and, in this example, is made of the same flexible material as the membrane 11. The passageway of the valve 43 is a slit 44 in the valve 43. The valve 43 with its slit 44 is designed such that the slit 44 is open only when the pressure drop across the valve 43 is greater than the predetermined relief pressure. The valve structure 47 further comprises a rigid valve seat 45 connected to the interior side of the upper part of the housing 26 for co-operation with the valve 43 with its slit 44. When the pump 3 (see FIG. 1) starts pumping and the valve 10 opens, the membrane 11 is lifted, causing the valve 43 to be pressed with its slit 44 against the valve seat 45, thereby closing off the valve 43. In this condition the water is allowed to be discharged to the discharge outlet 20 towards the coffee brewing unit, but is prevented from returning to the water reservoir. Since the opening of the discharge control valve 10 causes the return flow control valve 43 to be closed off, it is reliably ensured that the return flow control valve 43 does not remain open when the discharge control valve 10 opens.

FIG. 3 shows a third embodiment of a valve structure 107 for a beverage maker according to the invention in a rest position. The valve structure 107 of FIG. 3 comprises a water inlet 109 to be connected to a boiler, a return outlet 116 to be connected to a water reservoir, and a discharge outlet 120 to be connected to a coffee brewing unit. The valve structure 107 further comprises a rigid housing 126 and, inside the housing 126, a valve 110 with a membrane 111 of a suitable flexible material such as rubber. The membrane 111 has a substantially disc-shaped plan form of which the peripheral edge is clamped between parts of the housing 126. The housing 126 also has a substantially disc-shaped plan form. Integrated in a center region of the membrane 111 is a disc 150 of a rigid material. The disc 150 has a central opening in which a plug 151 is clamped.

A coil spring 112 is clamped between the interior side of the upper part of the valve structure housing 126 and the disc 150 and controls the position of the membrane 111. In the rest position of the valve structure 107 as shown, the spring 112 presses the membrane 111 against a ring-shaped flange 152 that extends upwards away from the lower part of the housing 126 in the interior of the housing 126. The pressure contact between the membrane 111 and the flange 152 is a sealing contact that closes off the passage of water from the water inlet 109 towards the discharge outlet 120.

The plug 151 is made of a suitable flexible material. It comprises an umbrella-shaped return flow control valve part 153 projecting from the upper side of the disc 150. The umbrella shaped part 153 sealingly presses against the upper side of the disc 150 along its peripheral edge, thus bounding a ring-shaped space 155. The plug 151 sealingly presses with its periphery against the edge of the central opening in the disk 150, except for a small and narrow axial passageway 154. The passageway 154 connects the space 155 with the space under the disc 150, which space is in direct communication with the water inlet 109.

In operation, if the overpressure in the boiler 5 caused by heating-up of the water in the boiler exceeds a predetermined relief pressure value, the water pushes the umbrella-shaped return control flow part 153 upwards along its peripheral edge. This allows excess volumes of water to escape towards the return outlet 116, the passage of water between the membrane 11 and a sealing rim 156 being open.

When the pump is activated, the pressure at the inlet side of the membrane increases and exceeds the discharge pressure value. This causes the membrane 111 to be pressed upwards against the force exerted by the coil spring 112, causing the passage between the membrane 111 and the sealing rim 152 from the inlet 109 to the discharge outlet 120 to be opened while simultaneously causing the passage between the membrane 111 and a sealing rim 156 towards the return outlet 116 to be closed owing to the sealing contact between these parts 111, 156. Thus, the membrane 111 forms a valve body of a discharge and return flow control valve 110.

In the examples according to FIGS. 2 and 3, the discharge pressure in response to which the passage of water to the coffee brewing unit 8 is opened is equal to the shut-off pressure in response to which the passage of water from the boiler 5 back to the water reservoir 2 is closed off. Nevertheless, it is very reliably ensured that the water return is closed off if the discharge of water is allowed.

Having described the invention with reference to examples, however, many modifications thereto will become apparent to those skilled in the art without deviation from the invention as defined by the scope of the appended claims. For instance, it is possible to apply two separate pressure control valves having separate inlets connected to the boiler instead of applying valve structures that integrate the first and second pressure control valves.

The invention claimed is:

1. A beverage maker comprising:
   a water reservoir (2);
   a closed water boiler (5);
   a beverage brewing unit (8);
   a water supply channel (25) interconnecting the water reservoir (2) and the closed water boiler (5);
   a water discharge channel (19) interconnecting the boiler (5) and the beverage brewing unit (8);
   a pump (3) for pumping water from the boiler (5) to the beverage brewing unit (8);
   a return channel (25) interconnecting the reservoir (2) and the boiler (5); and
   a valve structure (7; 47; 107) having an inlet (9 109) connected for water inflow from the boiler (5) and the pump (3), a return outlet (16; 116) connected for returning water to the reservoir (2), and a discharge outlet (20; 120) connected for water outflow to the brewing unit (8), the valve structure (13; 43; 153) being adapted for:
      preventing water passage from said inlet (9; 109) to said return outlet (16; 116) if the water pressure at said inlet (9; 109) is below a relief pressure value;
      allowing water passage from said inlet (9; 109) to said return outlet (16; 116) if the water pressure at said inlet (9; 109) is above said relief pressure value and below a shut-off pressure;
      preventing water passage from said inlet (9; 109) to said return outlet (16; 116) if the water pressure at said inlet (9; 109) is above said shut-off pressure value;
      preventing water passage from said inlet (9; 109) to said discharge outlet (20; 120) if the water pressure at said inlet (9; 109) is below a discharge pressure value; and
      allowing water passage from said inlet (9; 109) to said discharge outlet (20; 120) if the water pressure at said inlet (9; 109) is above said discharge pressure value;
   wherein said relief pressure value, said shut-off pressure value, and said discharge pressure value are predetermined at least to the extent that:
      said relief pressure value is above atmospheric pressure;
      said relief pressure value is lower than each of said shut-off pressure value and said discharge pressure value; and
      said shut-off pressure value and said discharge pressure value are each lower than a pumping pressure at said inlet (9; 109) generated by said pump (3) when said pump is in operation.

2. A beverage maker according to claim 1, wherein the valve structure (7; 47) comprises:
   a return flow control valve (13; 43) between an inlet portion (14) connected for water inflow from the boiler (5) and the pump (3) and said return outlet (18), said return flow control valve (13; 43) being adapted for:
      preventing water passage from said inlet (9) to said return outlet (16) if the water pressure at said inlet portion (14) is below said relief pressure value;
      allowing water passage from said inlet (9) to said return outlet (16) if the water pressure at said inlet portion (14) is above said relief pressure value and below said shut-off pressure; and
      preventing water passage from said inlet (9) to said return outlet (16) if the water pressure at said inlet portion (14) is above said shut-off pressure value; and
   a discharge control valve (10) between the inlet (9) and the discharge outlet (20), the discharge control valve (10) being adapted for:
      preventing water passage from said inlet (9) to said discharge outlet (20) if the water pressure at said inlet (9) is below said discharge pressure value; and
      allowing water passage from said inlet (9) to said discharge outlet (20) if the water pressure at said inlet (9) is above said discharge pressure value.

3. A beverage maker according to claim 1, wherein the valve structure (107) comprises:
   a return flow control valve (153) between an inlet portion (154) connected for water inflow from the boiler (5) and the pump (3) and the return outlet (116), the return flow control valve (153) being adapted for:
      preventing water passage from said inlet (109) to said return outlet (116) if the water pressure at said inlet portion (154) is below said relief pressure value; and
      allowing water passage from said inlet (109) to said return outlet (116) if the water pressure at said inlet portion (154) is above said relief pressure value and below said shut-off pressure; and
   a discharge and return flow control valve (110) downstream of the inlet (109) and upstream of the discharge outlet (120) and the return outlet (116), the discharge and return flow control valve (110) being adapted for:
      preventing water passage from said inlet (109) to said return outlet (116) if the water pressure at said inlet (109) is above said shut-off pressure value;
      preventing water passage from said inlet (109) to said discharge outlet (120) if the water pressure at said inlet (109) is below said discharge pressure value; and
      allowing water passage from said inlet (109) to said discharge outlet (120) if the water pressure at said inlet (109) is above said discharge pressure value.

4. A beverage maker according to claim 1, wherein said discharge pressure value is predetermined to be equal to or higher than said shut-off pressure value.

5. A beverage maker according to claim 1, wherein said relief pressure value is at least 0.1 bar over atmospheric pressure.

6. A beverage maker according to claim 1, wherein said relief pressure value is at most 0.5 bar over atmospheric pressure.

7. A beverage maker according to claim 1, wherein said shut-off pressure value is at least 0.4 bar over atmospheric pressure.

8. A beverage maker according to claim 1, wherein said shut-off pressure value is at most 1.4 bar over atmospheric pressure.

9. A beverage maker according to claim 1, wherein said discharge pressure is at least 0.8 bar over atmospheric pressure.

10. A beverage maker according to claim 2, wherein the discharge control valve has a valve body (11; 111), the return flow control valve (13; 43; 153) being an integral part of the discharge control valve body (11; 111).

11. A beverage maker according to claim 1, wherein the valve structure is dimensioned for venting all water flow caused by expansion in the boiler owing to a pressure lying above the relief pressure and induced by the heater (30).

12. A beverage maker according to claim 1, further comprising a restriction (21) in the discharge channel (19) downstream of and closely adjacent to the valve body (11) of the discharge control valve (10; 110).

13. A beverage maker according to claim 1, wherein, in closed condition, a valve body (11) preventing water passage from said inlet (9) to said discharge outlet has a first surface area communicating with the boiler (5) and, in opened condition allowing water passage from said inlet (9) to said discharge outlet, said valve body (11) has a second surface area communicating with the boiler (5), said second surface area being larger than said first surface area.

14. A beverage maker according to claim 2, wherein the discharge control valve (10; 110) and the return flow control valve (43) are coupled for causing the return flow control valve (43) to be closed off in response to an opening of the discharge control valve (10; 110).

* * * * *